(12) United States Patent
Hu et al.

(10) Patent No.: US 8,533,181 B2
(45) Date of Patent: Sep. 10, 2013

(54) PARTITION PRUNING VIA QUERY REWRITE

(75) Inventors: Ying Hu, Nashua, NH (US); Seema Sundara, Nashua, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 12/387,160

(22) Filed: Apr. 29, 2009

(65) Prior Publication Data

US 2010/0281017 A1    Nov. 4, 2010

(51) Int. Cl.
G06F 17/30    (2006.01)
G06F 7/00    (2006.01)

(52) U.S. Cl.
USPC .......................................... 707/718; 707/719

(58) Field of Classification Search
USPC ........................................................ 707/718
See application file for complete search history.

(56) References Cited

U.S. PATENT DOCUMENTS

| | | | |
|---|---|---|---|
| 5,924,088 A * | 7/1999 | Jakobsson et al. | 707/716 |
| 5,960,423 A * | 9/1999 | Chaudhuri et al. | 707/715 |
| 6,092,062 A * | 7/2000 | Lohman et al. | 707/999.002 |
| 6,269,375 B1 * | 7/2001 | Ruddy et al. | 1/1 |
| 6,885,993 B2 * | 4/2005 | Wu et al. | 704/500 |
| 6,920,460 B1 | 7/2005 | Srinivasan et al. | |
| 7,080,062 B1 * | 7/2006 | Leung et al. | 707/999.002 |
| 7,379,936 B2 | 5/2008 | Kuthuri et al. | |
| 8,166,059 B2 * | 4/2012 | Krishnaprasad et al. | 707/759 |
| 2002/0116199 A1 * | 8/2002 | Wu et al. | 704/500 |
| 2003/0144795 A1 * | 7/2003 | Lin | 701/213 |
| 2004/0249810 A1 * | 12/2004 | Das et al. | 707/5 |
| 2006/0155679 A1 * | 7/2006 | Kothuri et al. | 707/3 |
| 2007/0011167 A1 * | 1/2007 | Krishnaprasad et al. | 707/9 |
| 2009/0132474 A1 * | 5/2009 | Ma et al. | 707/2 |
| 2009/0228528 A1 * | 9/2009 | Ercegovac et al. | 707/203 |
| 2010/0274780 A1 * | 10/2010 | Galindo-Legaria et al. | 707/714 |

OTHER PUBLICATIONS

Cyran et al., 'Oracle Database Concepts', Oct. 2005, Oracle, Chapter 18.*

* cited by examiner

Primary Examiner — Pavan Mamillapalli
(74) Attorney, Agent, or Firm — Kraguljac Law Group, LLC

(57) ABSTRACT

Systems, methods, and other embodiments associated with query pruning via query rewrite are described. One example method includes receiving a query on a partitioned table that will result in a first query plan that includes accessing a local domain index on each partition in the database. The query is rewritten to generate a second query that will result in a second query plan that includes accessing a global domain index instead of the local domain index on each partition in the database.

16 Claims, 5 Drawing Sheets

PARTITION PRUNING VIA QUERY REWRITE

BACKGROUND

Large database tables are often partitioned to make the data stored in the table more manageable. The tables are typically partitioned based on a value of a given attribute in the data stored in the table, such as a chronological date or geographic region. To facilitate locating and storing data in the partitioned table, a partition metadata table typically is used to store information about the partitions in the database. Both global and local indexes can be used to speed up queries on the partitioned table. For queries with user-defined data types, and/or user-defined operations, user-defined indexes may also be used. For example, in some database systems, a spatial index is a kind of user-defined, or domain, index. SDO_GEOMETRY is a user-defined type and SDO_FILTER is a user-defined operator, which are built on top of a database.

Queries on a partitioned database can be handled according to many different query plans. For example, some query plans cause the query to be executed on each partition of the database. However, such a query plan results in significant overhead processing for execution of the query on the many partitions that do not contain any data relevant to the query. A reduction in processing overhead has been achieved by generating query plans in which certain queries on a partitioned database are executed by first accessing each of the individual partition's metadata to determine if the partition contains data that matches the query. Thus the query is executed on every partition's metadata. For the partitions that do not contain data that match the query predicate, no data is returned. While this approach can reduce the execution time and cost, overhead is still incurred for accessing each index partition in the database.

One type of data that is typically stored in partitioned database table is geographic or spatial data. A spatial index may be created to more efficiently process queries on spatial data. A geographic data table may include partitions that each represent, for example, a substantially contiguous 100 km by 100 km region. The partition metadata for a given partition typically stores a minimum bounding rectangle (MBR) for the data in the partition. The MBR is the smallest rectangle that completely encloses all of a defined spatial region. The root MBR for a partition is the smallest rectangle that completely encloses all of the spatial data in the partition. In the prior art query plan discussed above, a query plan is generated that accesses each spatial index partition and compares the MBR of the partition with the MBR of a query geometry object defined by a spatial query on the database. If the MBR intersects the MBR of the query geometry object, then the query is executed on the partition. If not, the query returns nothing. Thus the overhead for accessing each index partition is incurred in processing of the spatial query.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
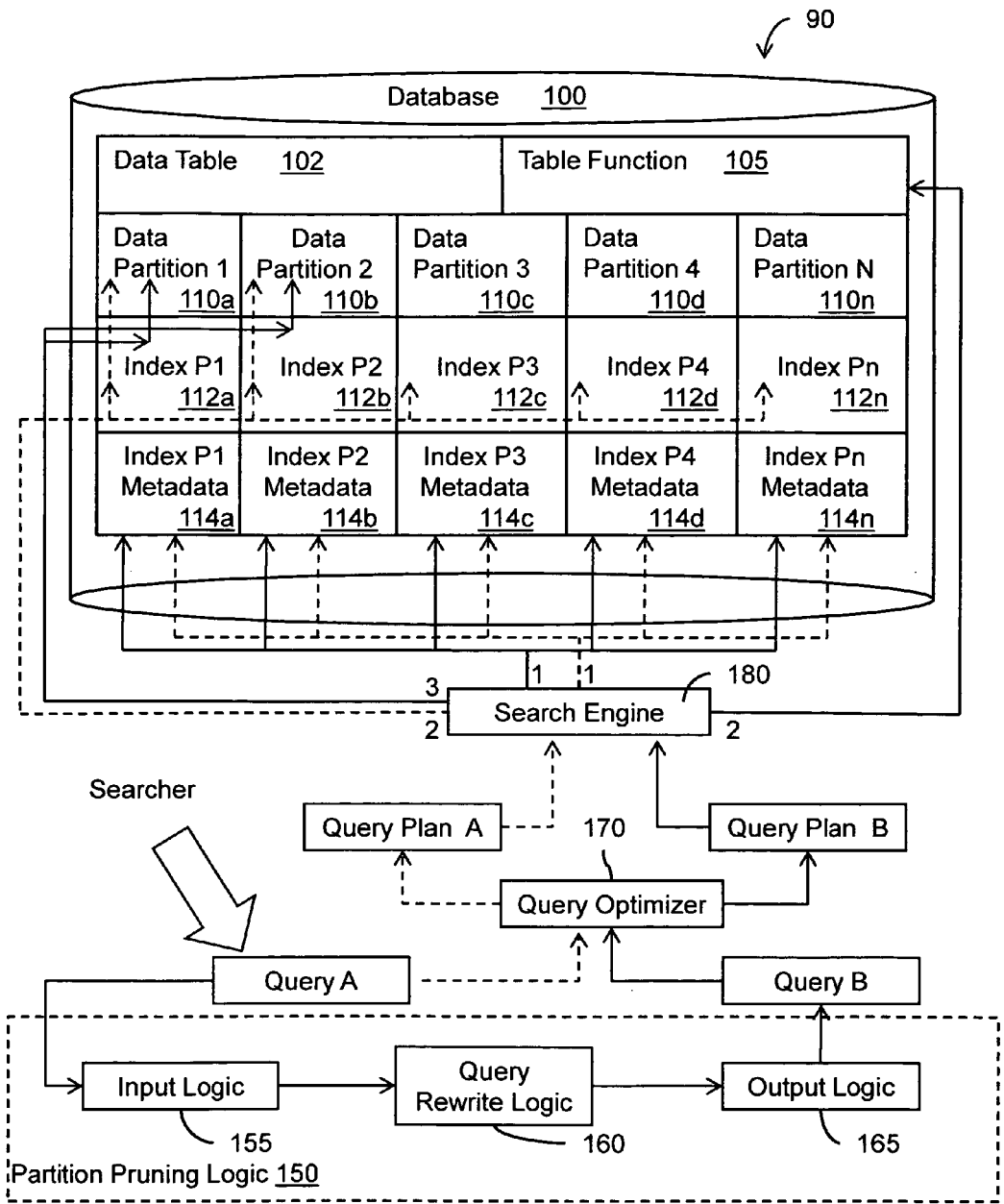
FIG. 1 illustrates an example embodiment of a system associated with partition pruning via query rewrite.

In an example embodiment, a query on a partitioned database that will result in a query plan that accesses each and every index partition is rewritten to result in a query plan that limits access to those index partitions that contain the requested data. Hence, the query plan for the rewritten query looks like a query plan that accesses a global index. The rewritten query accesses the index metadata and those index partitions that contain the requested data to populate a query table with identifiers for all rows in the database that contain data that matches the query. In the case of an SDO_FILTER operator on spatial data, the query table is populated with identifiers for all rows having an MBR that intersects an MBR of the query geometry object defined by the query. The rewritten query will then perform the row selection on the rows listed in the query table for data that matches the query. In this manner, the query may be executed without individually accessing partitions that do not contain data that matches the query, saving processing time and cost.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, software stored on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"Software", as used herein, includes but is not limited to, one or more executable instruction stored on a computer-readable medium that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1 illustrates one example embodiment of a query processing system 90 that processes queries input by a searcher on a database 100. The searcher may be, for example, a human user of the system, a computerized process seeking to retrieve data from the database, or any other mechanism by which a query may be presented to the database 100. The query processing system 90 includes a query optimizer 170 that parses an input query and develops a query plan. The query plan is presented to a search engine 180 that accesses database structures in the database 100 such as indexes and data tables according to the query plan to return data that matches the query.

The database 100 includes a partitioned data table 102. The data table 102 is partitioned into n partitions 110a-110n. A table function 105, which is a function returning a table, includes summary information about the various partitions 110a-110n and how the data is stored in the partitions 110a-110n. Each partition 110a-110n includes a local index partition 112a-112n and local index partition metadata 114a-114n. The index partitions 112a-112n and the index partition metadata 114a-114n include detailed and summary information about the data stored within the partition with which they are associated.

In the example illustrated in FIG. 1, the searcher enters Query A on the database 100. Query A seeks to return data from the database 100 that is found in one or more of the partitions 110a-110n. According to prior art query processing techniques, execution of the Query A would follow the path schematically shown as the dashed lines in FIG. 1. The Query A is parsed by the query optimizer 170, which generates a Query Plan A that is presented to the search engine 180. The Query Plan A includes accessing each partition index metadata 114a-114n to determine which of the partitions include data that matches Query A. The query plan A also includes accessing index partitions 112a-112n and table partitions 110a-110n. Although execution can be completed early from some partitions that were determined by accessing the partition index metadata 114a-114n, all index partitions 112a-112n and table partitions 110a-110n are processed under Query Plan A.

The query processing system 90 also includes a partition pruning logic 150 that prunes the number of partitions that are accessed by the search engine 180 when executing a query. The partition pruning logic 150 includes an input logic 155 that is configured to receive a query, i.e., Query A, from the searcher. As indicated by the solid lines in FIG. 1, the input logic receives the query and passes the query to a query rewrite logic 160. The query rewrite logic rewrites the Query A to replace a query operation in Query A that will result in a query plan that accesses each of the index partitions 112a-112n with a query operation that will result in a query plan that will access the table function 105.

The rewritten query, Query B, is presented by an output logic 165 to the query optimizer 170. The query optimizer 170 generates a Query Plan B based on the rewritten Query B. The search engine 180 processes the Query B according to the Query Plan B by accessing the table function 105. Inside the table function 105, each of the index partition metadata 114a-114n is accessed to determine which index partition should be accessed. In this example, the identified index partitions are Index P1 112a and Index P2 112b, which are accessed to return a table of row identifiers that are used to access Data Partition 1 110a and Data Partition 2 110b. Data that is returned from Data Partitions 1 and 2 by the search engine is then presented to the searcher.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
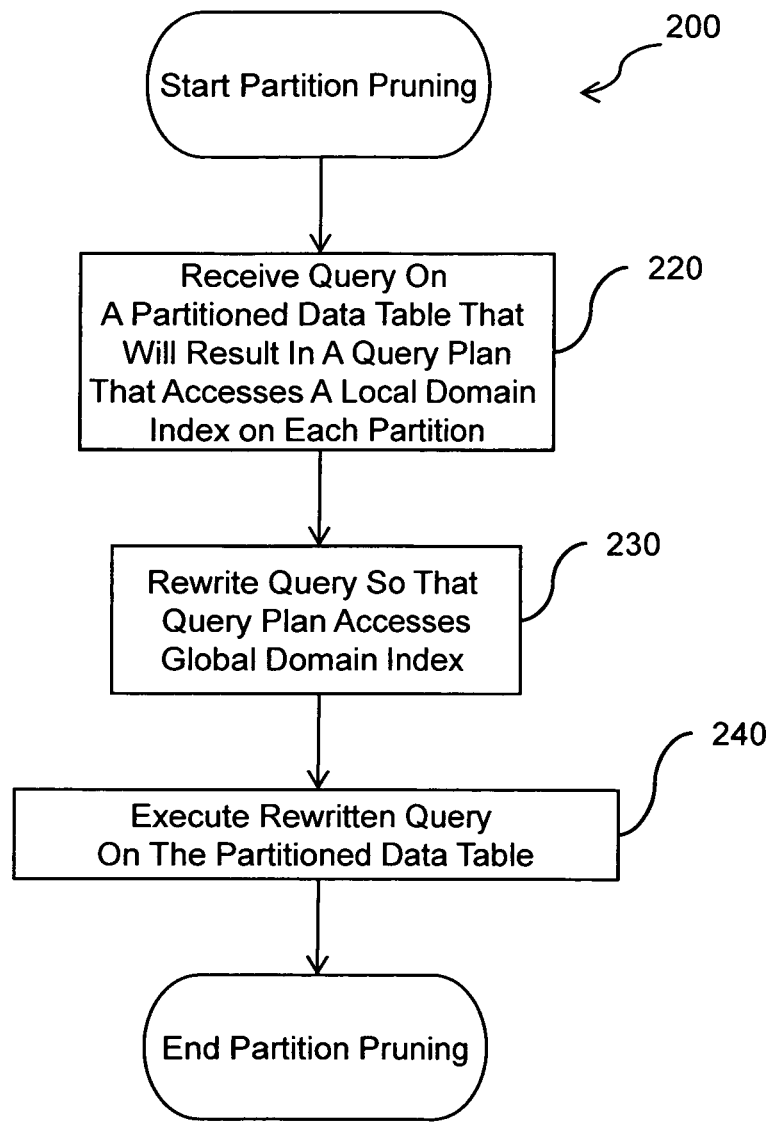
FIG. 2 illustrates another example embodiment of a method associated with partition pruning via query rewrite.

FIG. 2 illustrates an example embodiment of a partition pruning method 200. The partition pruning method 200 includes, at 220 receiving a query on a partitioned data table that will result in a query plan that accesses a local domain index on each partition in the table. This query may be a spatial query, a query on image data, or any type of query on any type of data that is stored in a partitioned data table. For example, the query may be a query issued on a partitioned data table, on which a local partitioned index is built, but where the query does not include a partition key in the where clause. Such a query would cause each index partition to be accessed.

At 230, the query is rewritten so that the query plan will access a global domain index rather than accessing each partition of the local domain index and also each partition of the table. The query is rewritten such that a local domain index is made to look like a global domain index so that the overhead associated with accessing each partition of the local domain index is eliminated and replaced with the overhead for accessing the global domain index. For example, the predicate of the query may be replaced with a row selection operator that selects rows from a query table that is populated with row identifiers that can be used to fetch data that matches the query. Population of the query table is performed by accessing the domain index partitions that match the query and the row selection operator will only access those rows listed in the query table that include data that matches the query. These rows are in the selected partitions after pruning. At 240, the rewritten query is executed on the selected partitions of the data table via fetching by row identifiers.

While FIG. 2 illustrates various actions occurring in serial, it is to be appreciated that various actions illustrated in FIG. 2 could occur substantially in parallel. By way of illustration, a first process could execute the row selection operation on a first data table partition, a second process could execute the row selection operation on a second data table partition, and so on. While two processes are described, it is to be appreciated that a greater and/or lesser number of processes could be employed and that lightweight processes, regular processes, threads, and other approaches could be employed.

Figure 3:
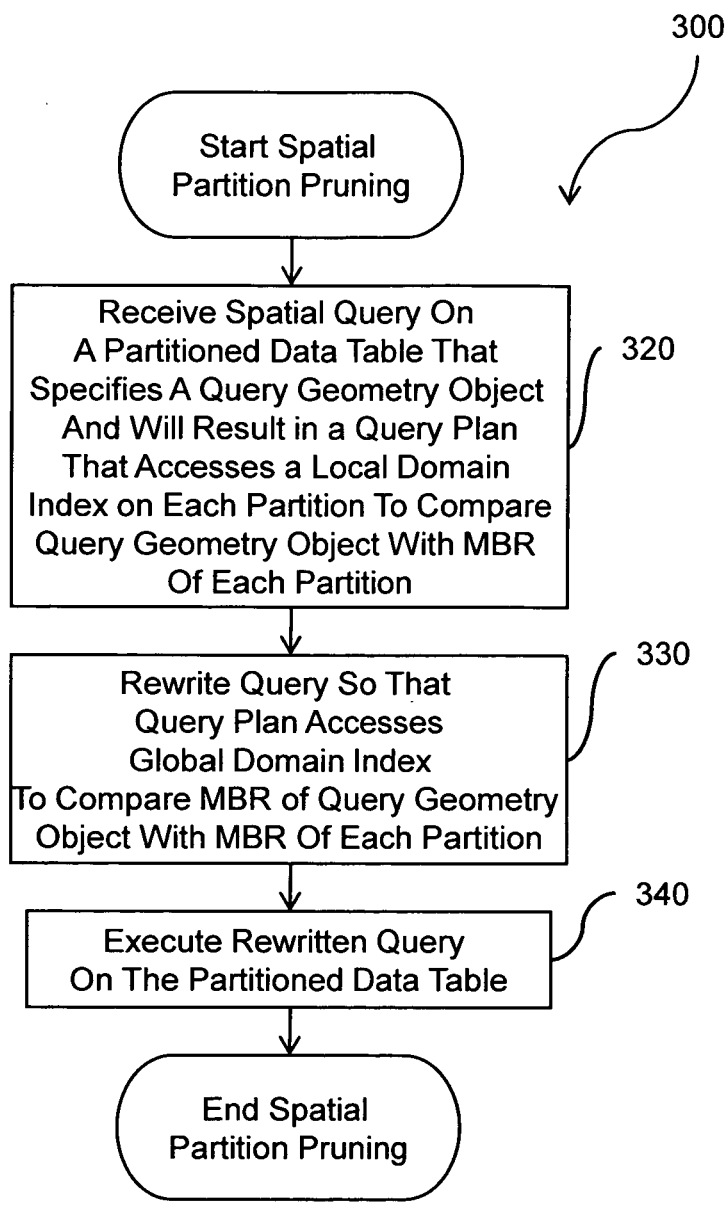
FIG. 3 illustrates another example embodiment of a method associated with partition pruning via query rewrite.

FIG. 3 illustrates one example embodiment of a method that performs spatial partition pruning on spatial data. At 320 a spatial query is received on a partitioned data table that specifies a query geometry object. The spatial query will result in a query plan that accesses a local domain index on each partition to compare the query geometry object with an MBR of each partition. The following query is an example of such a spatial query.

```
select count(*)
  from mdtest.part_geoms a
  where SDO_FILTER (a.geom,
        SDO_GEOMETRY(2002, 8307, NULL,
        SDO_ELEM_INFO_ARRAY(1, 2, 1),
        SDO_ORDINATE_ARRAY(.05, 0, .06, .01))) = 'TRUE'
```

Because there is no partition key in the where clause, the query plan will specify that the local domain index on each partition should be accessed to determine if the partition's MBR intersects the geometry defined in the SDO_FILTER clause. The query plan for the above query will be as follows:
(1) SELECT STATEMENT
(2) SORT AGGREGATE
(3) PARTITION RANGE ALL
(4) TABLE ACCESS BY LOCAL INDEX ROWID
(5) DOMAIN INDEX
The operations of (3), (4) and (5) will be performed once for each partition.

In 330, the query is rewritten so that it will result in a query plan that accesses a global domain index rather than the local domain index partitions. The lack of a partition key in the where clause is one potential triggering mechanism for 330 to be performed. The query below is one example of how the above query can be rewritten so that the global domain index is accessed rather than the local domain index partitions.

```
select count(*)
   from mdtest.part_geoms a
   where a.rowid IN
       (SELECT CHARTOROWID(COLUMN_VALUE)
       FROM TABLE(MDSYS.SDO_PQRY(
           '"MDTEST"',              <- table schema
           '"PART_GEOMS"',          <- table name
           '"MDTEST"',              <- index schema
           '"PART_GEOMS_IDX"'       <- index name
           '"GEOM"',                <- index column name
           '"SDO_FILTER"',          <- operator name
           8307,                    <- index srid
           1,                       <- 1: geodetic 0: non-geodetic
           SDO_GEOMETRY(2002, 8307,   NULL, <- the query
           geometry
           SDO_ELEM_INFO_ARRAY(1, 2, 1),
           SDO_ORDINATE_ARRAY(.05, 0, .06, .01))))));
```

In 330, a method is called that replaces the predicate associated with the spatial operator with a new predicate "rowid in (select * from table( ))". The new predicate in the example includes a table function called MDSYS.SDO_PQRY, which will be described in more detail with reference to FIG. 4. The rewritten query will result in the following query plan.
SELECT STATEMENT
SORT AGGREGATE
NESTED LOOPS
TABLE FUNCTION FETCH
TABLE ACCESS BY USER ROWID
In the second query plan, the PARTITION RANGE ALL operation is eliminated and the predicate has been replaced with the SDO_PQRY that returns a set of row identifiers, which are used to do table access. SDO_PQRY act like a global domain index rather than a local domain index. Only partitions that have data that match the query will be accessed.

Figure 4:
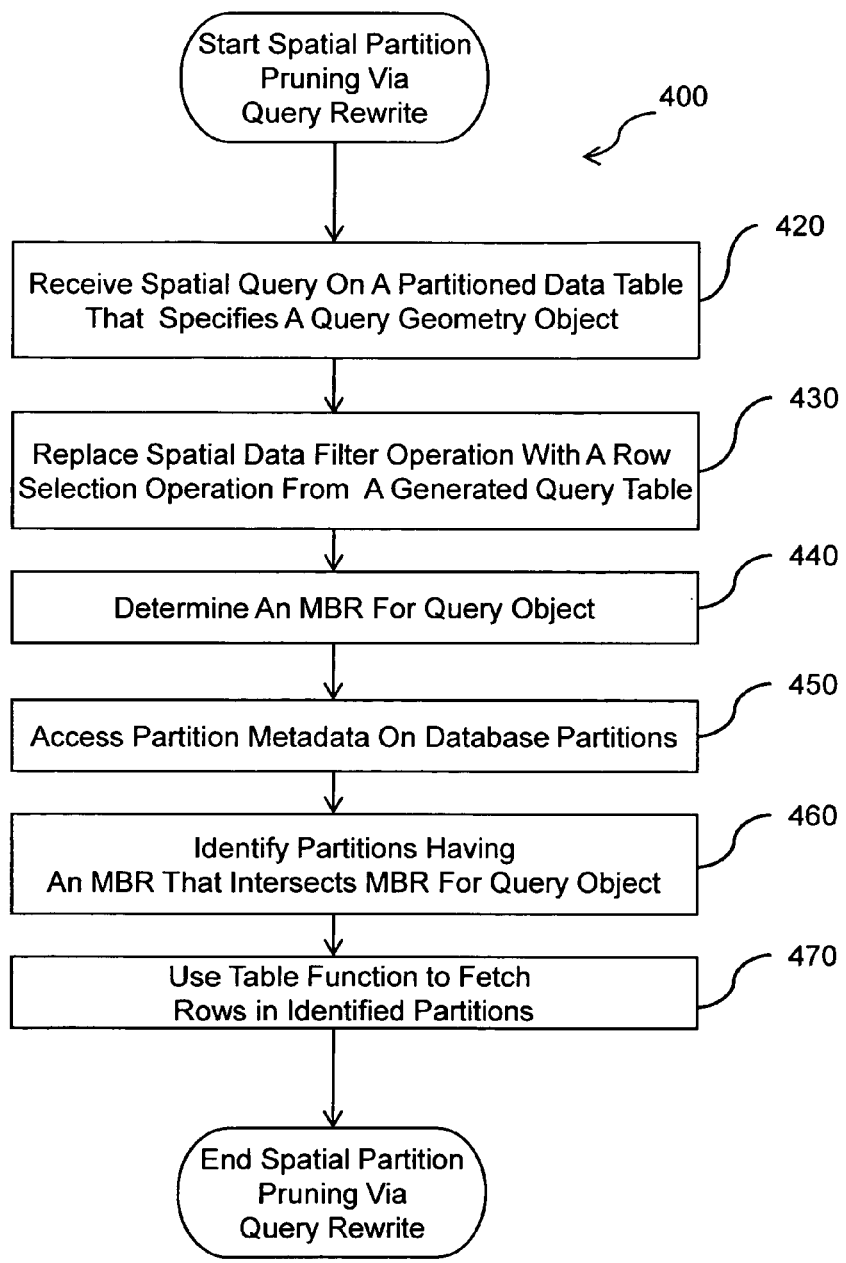
FIG. 4 illustrates an example embodiment of a method associated with partition pruning via query rewrite.

FIG. 4 outlines an example embodiment of a method 400 that may be used to rewrite a spatial query to access a global, rather than local, domain index. At 420 a spatial query on a partitioned data table is received that specifies a query geometry object. At 430, the spatial data filter operation (i.e., the WHERE SDO_FILTER clause in the example query above) is replaced with a row selection operation from a generated query table. SDO_PQRY in the rewritten query above is one example of a table function that can be used to generate the query table. SDO_PQRY returns a table of row identifiers that identify partitions having data that matches the query.

At 440, an MBR is determined for the query object. If necessary, the query geometry object's geo-referenced coordinate system is transformed to match the index's coordinate system using the index's SRID (Spatial Reference Identifier). At 450, the metadata that includes MBR information for each partition in the data table is accessed. At 460, partitions that store data matching the query are identified. At 470, a parallel table function MDSYS.QUERY2OPT is called to fetch rows in the partitions identified at 460. Since this function is parallel enabled, different partitions can be processed in parallel.

In one example, a method may be implemented as computer executable instructions. Thus, in one example, a computer-readable medium may store computer executable instructions that if executed by a machine (e.g., processor) cause the machine to perform a method that includes receiving a spatial query that will result in a query plan that accesses each index partition associated with each database partition; rewriting the query to replace a spatial filter operator with a first table operator that populates a table with row identifiers associated with each database partition whose root MBR intersects the MBR of the query geometry object; where the first table operator will result in a query plan that accesses a global domain index for the partitions to populate the table; and returning the populated table. While executable instructions associated with the above method are described as being stored on a computer-readable medium, it is to be appreciated that executable instructions associated with other example methods described herein may also be stored on a computer-readable medium.

Figure 5:
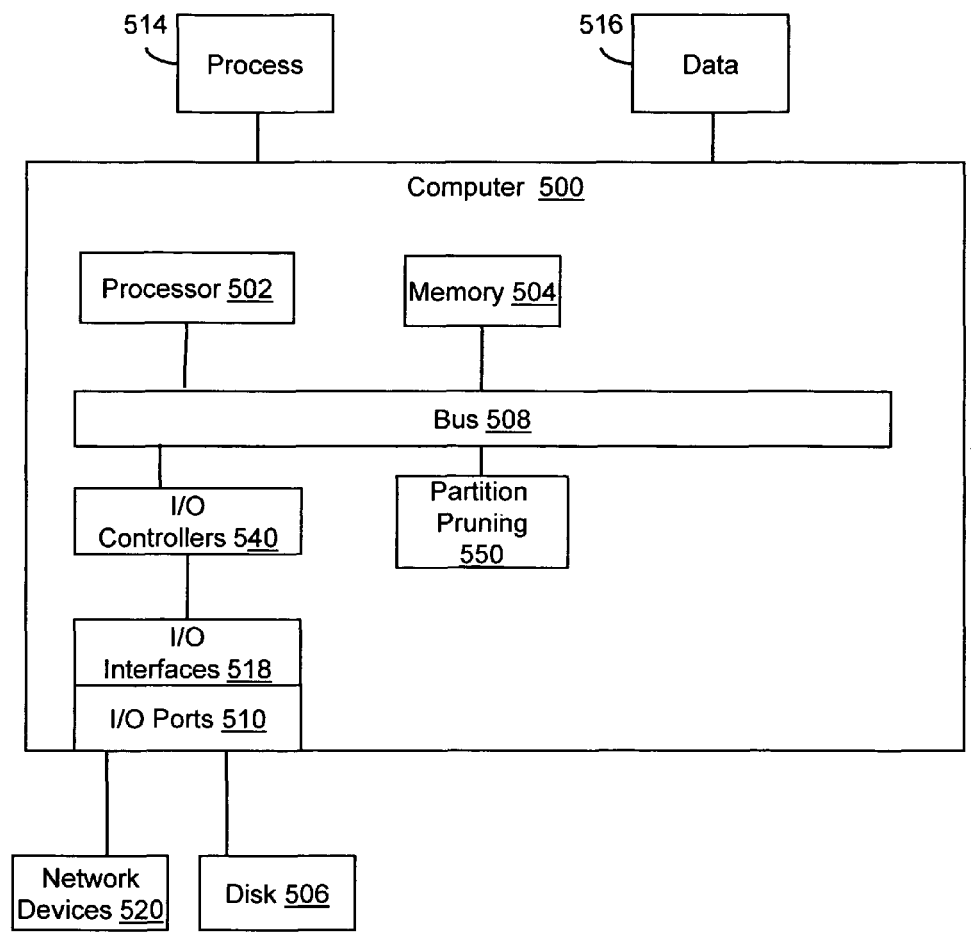
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a partition pruning logic 550 configured to facilitate rewriting queries so that their execution results in access of a global domain index rather than a local domain index on each partition in a partitioned database. In different examples, the logic 550 may be implemented in hardware, software, firmware, and/or combinations thereof. While the logic 550 is illustrated as a hardware component attached to the bus 508, it is to be appreciated that in one example, the logic 550 could be implemented in the processor 502.

Thus, logic 550 may provide means (e.g., hardware, software, firmware) for means for receiving a query on a partitioned database, the query being configured as an input for a search engine, the search engine being configured to retrieve data in response to receiving a query, where the data is retrieved from one or more database partitions. The logic 550 may provide means for rewriting a query that will result in a first query plan that includes accessing a local domain index on each partition in the database such that the rewritten query will result in a second query plan that includes accessing a global domain index instead of the local domain index on each partition in the database. The logic 550 may provide means for providing the rewritten query to the search engine to retrieve data that matches the query.

The means may be implemented, for example, as an ASIC programmed to rewrite queries so that their execution results in access of a global domain index rather than a local domain index on each partition in a partitioned database. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method, comprising:
    receiving a query on a partitioned table, where the query includes a first query operation that will result in a first query plan that includes accessing local domain indexes associated with individual partitions in the table to identify table partitions having data that meets the query criteria;
    rewriting the query to replace the first query operation with a second query operation that will result in a second query plan that includes a table function for accessing a global domain index to create a table that includes entries corresponding to row identifiers that identify table partitions having data that meets the query criteria instead of the local domain indexes associated with individual partitions of the tablet, where the table function includes a first operation that accesses a global domain index that indexes partition metadata on the table partitions to identify table partitions that meet the query criteria; and executing the rewritten query on the partitioned table to return records that match the query.

2. The computer-implemented method of claim 1 where the table function includes a second operation that accesses table partitions returned by the first operation to return records that meet the query criteria.

3. The computer-implemented method of claim 1 where the table stores spatial data in partitions and further where the query is a spatial query that specifies a query geometry object and where the second query operation results in a second query plan that includes comparing the query geometry object with index partition metadata to identify partitions that include records that match the query.

4. The computer-implemented method of claim 3, where the second query plan comprises fetching records in the identified partitions that match the query.

5. The computer-implemented method of claim 3 where the first query operation comprises a spatial data filter operator and the second query operation comprises a row selection from a query table that is generated by accessing a global index on the partitions.

6. The computer-implemented method of claim 3 where the second query operation comprises:
  determining a minimum bounding rectangle for the query geometry object;
  accessing global index partition metadata on the table partitions;
  comparing the minimum bounding rectangle for the query geometry object with a root minimum bounding rectangle for the partitions stored in the global index partition metadata;
  returning partitions having a root minimum bounding rectangle that intersects the minimum bounding rectangle for the query geometry object; and
  fetching records from the returned partitions.

7. The computer-implemented method of claim 6 comprising transforming a coordinate system of the query geometry object to a reference coordinate system associated with the global index partition metadata.

8. The computer-implemented method of claim 6 where the fetching of records from returned partitions is performed at least partially in parallel.

9. A computing system, comprising:
  an input logic configured to receive a query on a partitioned table, the query being configured as an input for a search engine, the search engine being configured to retrieve data in response to receiving a query, where the data is retrieved from one or more table partitions;
  a query rewriting logic to rewrite a query that includes a first query operation that will result in a first query plan that includes accessing local domain indexes on individual partitions of the table to identify table partitions having data that meets the query criteria, the rewriting including replacing the first query operation with a second query operation that will result in a second query plan that includes a table function for accessing a global domain index to create a table that includes entries corresponding to row identifiers that identify table partitions having data that meets the query criteria instead of the local domain indexes on individual partitions of the table, where the table function includes a first operation that accesses a global domain index that indexes partition metadata on the table partitions to identify table partitions that meet the query criteria; and
  an output logic configured to provide the rewritten query to the search engine to retrieve data that matches the query.

10. The computing system of claim 9 where the query rewriting logic rewrites a received query to replace a spatial data filter operator with a row selection operator on the table of row identifiers to fetch data matching the query.

11. The computing system of claim 9 where the query comprises a spatial query that specifies a query geometry object and further where the rewriting logic rewrites the query by determining a minimum bounding rectangle for the query geometry object; accessing global index partition metadata on the database partitions; comparing the minimum bounding rectangle stored in the global index partition metadata for the query geometry object with a root minimum bounding rectangle for the partitions; returning partitions having a root minimum bounding rectangle that intersects the minimum bounding rectangle for the query geometry object; and fetching records from the returned partitions.

12. A non-transitory computer-readable medium storing computer-executable instructions that when executed by a computer cause the computer to perform a method, the method comprising:
  receiving a spatial query on a partitioned table that stores spatial data, the spatial query including a spatial filter operator that defines a query geometry object, where the spatial filter operator will result in a query plan that accesses local domain indexes associated with individual table partitions to identify table partitions having data that meets the query criteria;
  rewriting the query to replace the spatial filter operator with a first table operator that accesses a global domain index to construct a table that includes entries corresponding to row identifiers associated with database partitions that store data matching the query geometry object; such that the first table operator will result in a query plan that accesses a global domain index for the database partitions to populate the table, where the global domain index indexes partition metadata on the database partitions to identify table partitions that meet the query criteria; and
  returning the populated table.

13. The non-transitory computer-readable medium of claim 12 where the method further comprises rewriting the query to replace the spatial filter with a second table operator that comprises fetching records from the partitions listed in the table.

14. The non-transitory computer-readable medium of claim 13 where the second table operator fetches records in parallel from multiple partitions.

15. The non-transitory computer-readable medium of claim 12 where the first table operator causes the computer to:
  determine a minimum bounding rectangle for the query geometry object;
  access global index partition metadata on the table partitions;
  compare the minimum bounding rectangle for the query geometry object with a root minimum bounding rectangle for the partitions stored in the global index partition metadata; and
  populate the table with row identifiers associated with partitions having a root minimum bounding rectangle that intersects the minimum bounding rectangle for the query geometry object.

16. The non-transitory computer-readable medium of claim 15 where the first table operator causes the computer to transform a coordinate system of the query geometry object to a reference coordinate system associated with the index partition metadata.

* * * * *

UNITED STATES PATENT AND TRADEMARK OFFICE
CERTIFICATE OF CORRECTION

| | | |
|---|---|---|
| PATENT NO. | : 8,533,181 B2 | Page 1 of 1 |
| APPLICATION NO. | : 12/387160 | |
| DATED | : September 10, 2013 | |
| INVENTOR(S) | : Hu et al. | |

It is certified that error appears in the above-identified patent and that said Letters Patent is hereby corrected as shown below:

In the Specification

In column 4, line 54, delete "P1112a" and insert -- P1 112a --, therefor.

In column 4, line 56, delete "1110a" and insert -- 1 110a --, therefor.

Signed and Sealed this
Tenth Day of December, 2013

Margaret A. Focarino
*Commissioner for Patents of the United States Patent and Trademark Office*